United States Patent
Springer, IV et al.

(10) Patent No.: US 12,126,707 B2
(45) Date of Patent: *Oct. 22, 2024

(54) FULLY HOMOMORPHIC ENCRYPTION TRANSPILER FOR HIGH-LEVEL LANGUAGES

(71) Applicant: Google LLC, Mountain View, CA (US)

(72) Inventors: Robert Coleman Springer, IV, Campbell, CA (US); Bryant Gipson, Campbell, CA (US); Shruthi Gorantala, Mountain View, CA (US); Sean Purser-Haskell, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,254

(22) Filed: Nov. 15, 2023

(65) Prior Publication Data
US 2024/0089085 A1    Mar. 14, 2024

Related U.S. Application Data

(63) Continuation of application No. 17/644,422, filed on Dec. 15, 2021, now Pat. No. 11,849,020.

(51) Int. Cl.
*H04L 9/00* (2022.01)
*G06F 8/41* (2018.01)
*H04L 9/06* (2006.01)

(52) U.S. Cl.
CPC .............. *H04L 9/008* (2013.01); *G06F 8/41* (2013.01); *H04L 9/0618* (2013.01)

(58) Field of Classification Search
CPC .......... H04L 9/008; H04L 9/0618; G06F 8/41
See application file for complete search history.

(56) References Cited

U.S. PATENT DOCUMENTS

2017/0257385 A1* 9/2017 Overson ............. H04L 63/1416
2019/0065552 A1 2/2019 Brantner et al.
(Continued)

OTHER PUBLICATIONS

Translating Algorithms to Handle Fully Homomorphic Encrypted Data on the Cloud, by Sengupta et al., published 2018. (Year: 2018).*

(Continued)

*Primary Examiner* — Vu V Tran
(74) *Attorney, Agent, or Firm* — Honigman LLP; Brett A. Krueger

(57) ABSTRACT

A method includes obtaining first code in a high-level programming language. The first code represents a first function for performing one or more operations on plaintext. The method also includes converting the first code into an intermediate representation comprising a list of nodes. Each node of the list of nodes includes one or more logical operations. The method also includes converting the intermediate representation into a Boolean intermediate representation that includes a plurality of single-bit logical operations. The method also includes transpiling the Boolean intermediate representation into second code in the high-level programming language. The second code represents a second function for performing, using fully homomorphic encryption (FHE), the one or more operations on ciphertext.

20 Claims, 11 Drawing Sheets

(56) References Cited

U.S. PATENT DOCUMENTS

| | | | |
|---|---|---|---|
| 2019/0372771 | A1 | 12/2019 | Wagner et al. |
| 2021/0034333 | A1* | 2/2021 | Skabelin .................. G06F 8/30 |
| 2021/0194669 | A1 | 6/2021 | Battistello et al. |
| 2022/0303113 | A1 | 9/2022 | Zheng et al. |
| 2022/0329407 | A1 | 10/2022 | Soceanu et al. |
| 2024/0039693 | A1* | 2/2024 | Hoshizuki ............. H04L 9/0618 |

OTHER PUBLICATIONS

International Search Report and Written Opinion for the related Application No. PCT/US2022/080602, dated Mar. 24, 2023, 70 pages.

Shruthi Gorantala et al: "A General Purpose Transpiler for Fully Homomorphic Encryption", IACR, International Association for Cryptologic Research, vol. 20210616: 133042 Jun. 15, 2021 (Jun. 15, 2021), pp. 1-10, XP061059469, Retrieved from the Internet: URL:https://eprint.iacr.org/2021/811 .pdf [retrieved on Jun. 15, 2021], 20 pages.

Anonymous: "XLS: Accelerated HW Synthesis XLS Optimizations", May 13, 2021 (May, 13 2021}, pp. 1-14, XP093032073, Retrieved from the Internet: URL:https://web.archive.org/web/20210513064517/https://google.github.io/xls/optimizations/ [retrieved on Mar. 15, 2023], 19 pages.

Alexander Viand et al: "Marble", Encrypted Computing & Applied Homomorphic Cryptography, ACM, 2 Penn Plaza, Suite 701 New York NY 10121-0701 USA, Jan. 15, 2018 (Jan. 15, 2018), pp. 49-60, XP058420132, DOI: 10.1145/3267973.3267978 ISBN: 978-1 4503-5987 -0, 12 pages.

USPTO. Office Action relating to U.S. Appl. No. 17/644,422, dated Mar. 30, 2023.

Shruthi Gorantala et al: "A General Purpose Transpiler for Fully Homomorphic Encryption", IACR, International Association for Cryptologic Research, vol. 20210616: 133042 June 15, 2021 (Jun. 15, 2021), pages 1-10, XP061059469, Retrieved from the Internet: URL:https://eprint.iacr.org/2021/811 .pdf [retrieved on Jun. 15, 2021], 20 pages.

Anonymous: "XLS: Accelerated HW Synthesis XLS Optimizations", May 13, 2021 (May 13, 2021}, pages 1-14, XP093032073, Retrieved from the Internet: URL:https://web.archive.org/web/20210513064517/https://google.github.io/xls/optimizations/ [retrieved on Mar. 15, 2023-03-15], 19 pages.

* cited by examiner

```
#include "string_cap.h"
State::State()
  : last_was_space_(true) {
} unsigned char State::process(unsigned char c) {
    unsigned char ret = c;

if(last_was_space_ && (c >= 'a') && (c <= 'z'))
        ret -= ('a' - 'A');

last_was_space_ = (c == ' ');
    return ret;
}

// Note: Way to mark State::process() as main function
char my_package(State &st, char c) {
    return st.process(c);
}
```

FIG. 5A

```
package my_package
fn _ZN5State7processEh(this: (bits[1], c: bits[8]) -> (bits[8],
(bits[1])) {
  literal.20: bits[8] = literal(value=97, pos=1,10,2)
  literal.31: bits[8] = literal(value=97, pos=1,11,3)
  literal.29: bits[8] = literal(value=65, pos=1,11,3)
  zero_ext.22: bits[32] = zero_ext(c, new_bit_count=32, pos=1,10,2)
  sign_ext.21: bits[32] = sign_ext(literal.20, new_bit_count=32,
  pos=1,10,2)
  ...
  tuple_index.37: bits[1] = tuple_index(this, index=0, pos=1,13,2)
  zero_ext.38: bits[32] = zero_ext(c, new_bit_count=32, pos=1,13,2)
  ret tuple.44: (bits[8], (bits[1])) = tuple(sel.36, tuple.40, pos=1,7,1)
}
fn my_package(st: (bits[1]), c: bits[8]) -> (bits[8], (bits[1])) {
  invoke.45: (bits[8], (bits[1])) = invoke(st, c,
  to_apply=_ZN5State7processEh, pos=1,19,2)
  tuple_index.46: bits[8] = tuple_index(invoke.45, index=0, pos=1,19,2)
  tuple_index.47: (bits[1]) = tuple_index(invoke.45, index=1, pos=1,19,2)
  ret tuple.48: (bits[8], (bits[1])) = tuple(tuple_index.46,
  tuple_index.47, pos=1,18,1)
}
```

FIG. 5B

```
package my_package fn my_package(st: (bits[1]), c: bits[8]) -> (bits[8], (bits[1])) {
  literal.86: bits[1] = literal(value=0, pos=1,10,2)
  concat.87: bits[9] = concat(literal.86, c, pos=1,10,2)
  literal.88: bits[9] = literal(value=97, pos=1,10,2)
  literal.89: bits[9] = literal(value=122, pos=1,10,2)
  bit_slice.101: bits[3] = bit_slice(c, start=5, width=3, pos=1,11,3)
  literal.106: bits[3] = literal(value=7, pos=1,11,3)
  tuple_index.90: bits[1] = tuple_index(st, index=0, pos=1,10,2)
  sge.91: bits[1] = sge(concat.87, literal.88, pos=1,10,2)
  sle.92: bits[1] = sle(concat.87, literal.89, pos=1,10,2)
  add.103: bits[3] = add(bit_slice.101, literal.106, pos=1,11,3)
  bit_slice.104: bits[5] = bit_slice(c, start=0, width=5, pos=1,11,3)
  literal.94: bits[8] = literal(value=32, pos=1,13,2)
  and.95: bits[1] = and(tuple_index.90, sge.91, sle.92, pos=1,10,2)
  concat.105: bits[8] = concat(add.103, bit_slice.104, pos=1,11,3)
  eq.97: bits[1] = eq(c, literal.94, pos=1,13,2)
  sel.98: bits[8] = sel(and.95, cases=[c, concat.105])
  tuple.99: (bits[1]) = tuple(eq.97, pos=1,13,2)
  ret tuple.40: (bits[8], (bits[1])) = tuple(sel.98, tuple.99, pos=1,18,1)
}
```

FIG. 5C

```
Boolean-ized IR:
package p fn my_package_boolean(st: (bits[1]), c: bits[8]) -> (bits[8],
(bits[1])) {
    literal.115: bits[8] = literal(value=1)
    shr1.117: bits[8] = shr1(c, literal.115)
    shr1.119: bits[8] = shr1(shr1.117, literal.115)
    shr1.121: bits[8] = shr1(shr1.119, literal.115)
    shr1.123: bits[8] = shr1(shr1.121, literal.115)
    shr1.125: bits[8] = shr1(shr1.123, literal.115)
    shr1.127: bits[8] = shr1(shr1.125, literal.115)
    ...
    shr1.131: bits[8] = shr1(shr1.129, literal.115)
    and.196: bits[1] = and(and.189, or.195)
    and.263: bits[1] = and(and.256, or.262)
    or.346: bits[1] = or(or.345, and.342)
    ret tuple.468: (bits[8], (bits[1])) = tuple(concat.465, tuple.467)
)
```

FIG. 5D

```
#include <tfhe/tfhe.h>
include <tfhe/tfhe_io.h> include <unordered_map> void my_package_boolean(LweSample* result, LweSample* st, LweSample* c,
                        const TFheGateBootstrappingCloudKeySet* bk) {
    std::unordered_map<int, LweSample*> temp_nodes;

temp_nodes[115] = new_gate_bootstrapping_ciphertext(bk->params);
    bootsCONSTANT(temp_nodes[115], 1, bk);
    ...
    ...
    bootsCOPY(&result[2], temp_nodes[459], bk);
    bootsCOPY(&result[3], temp_nodes[460], bk);
    bootsCOPY(&result[4], temp_nodes[461], bk);
    bootsCOPY(&result[5], temp_nodes[462], bk);
    for (auto it = temp_nodes.begin(); it != temp_nodes.end(); ++it) {
        delete_gate_bootstrapping_ciphertext(it->second);
    }
}
```

FIG. 5E

FULLY HOMOMORPHIC ENCRYPTION TRANSPILER FOR HIGH-LEVEL LANGUAGES

CROSS REFERENCE TO RELATED APPLICATIONS

This U.S. patent application is a continuation of, and claims priority under 35 U.S.C. § 120 from, U.S. patent application Ser. No. 17/644,422, filed on Dec. 15, 2021. The disclosure of this prior application is considered part of the disclosure of this application and is hereby incorporated by reference in its entirety.

TECHNICAL FIELD

This disclosure relates to fully homomorphic encryption transpilers for high-level languages.

BACKGROUND

Fully homomorphic encryption (FHE) is a technology by which arbitrary operations can be performed on encrypted data without the need to ever unencrypt the data. The current state of the art in FHE operates on primitive operators such as gates (AND gates, OR gates, NOT gates, etc.), ADD, and MUL. Requiring operations to be described at such primitive levels greatly restricts the problems to which FHE can be applied. For example, manually creating a thirty-two bit full adder requires 160 gates. Thus, the gate count required for manually implementing even moderately complex computations (e.g., string processing) quickly becomes infeasible.

SUMMARY

One aspect of the disclosure provides a computer-implemented method that, when executed by data processing hardware, causes the data processing hardware to perform operations. The operations include obtaining first code in a high-level programming language. The first code represents a first function for performing one or more operations on plaintext. The operations include converting the first code into an intermediate representation including a list of nodes. Each node of the list of nodes includes one or more inputs and one or more outputs. The operations include converting, using the one or more inputs and the one or more outputs of each node of the list of nodes, the intermediate representation into a Boolean intermediate representation that includes a plurality of single-bit logical operations. The operations also include transpiling the Boolean intermediate representation into second code in the high-level programming language. The second code represents a second function for performing, using fully homomorphic encryption (FHE), the one or more operations on ciphertext.

Implementations of the disclosure may include one or more of the following optional features. In some implementations, each of the plurality of single-bit logical operations include an AND operation, an OR operation, or a NOT operation. Converting the intermediate representation into the Boolean intermediate representation may include, for each respective node of the list of nodes, topologically sorting the list of nodes such that input nodes of the respective node are before the respective node in the list of nodes. In these examples, converting the intermediate representation into the Boolean intermediate representation may further include, for each respective sorted node of the list of nodes, generating one or more single-bit logical gates representative of the one or more operations.

Optionally, converting the intermediate representation into the Boolean intermediate representation includes splitting a multi-bit parameter into a plurality of single-bit parameters. In some implementations, converting the intermediate representation into the Boolean intermediate representation includes appending a plurality of single-bit outputs into a single multi-bit output. Transpiling the Boolean intermediate representation into the second code in the high-level programming language may include, for each respective single-bit logical operation of the plurality of single-bit logical operations, replacing the respective single-bit logical operation with a corresponding FHE routine.

In some examples, the operations further include incorporating the second function into an application in the high-level programming language. Optionally, the high-level programming language includes C++. The operations further include, in some implementations, executing the second function to perform the one or more operations on the ciphertext.

Another aspect of the disclosure provides data processing hardware and memory hardware in communication with the data processing hardware. The memory hardware stores instructions that when executed on the data processing hardware cause the data processing hardware to perform operations. The operations include obtaining first code in a high-level programming language. The first code represents a first function for performing one or more operations on plaintext. The operations include converting the first code into an intermediate representation including a list of nodes. Each node of the list of nodes includes one or more inputs and one or more outputs. The operations include converting, using the one or more inputs and the one or more outputs of each node of the list of nodes, the intermediate representation into a Boolean intermediate representation that includes a plurality of single-bit logical operations. The operations also include transpiling the Boolean intermediate representation into second code in the high-level programming language. The second code represents a second function for performing, using fully homomorphic encryption (FHE), the one or more operations on ciphertext.

This aspect may include one or more of the following optional features. In some implementations, each of the plurality of single-bit logical operations include an AND operation, an OR operation, or a NOT operation. Converting the intermediate representation into the Boolean intermediate representation may include, for each respective node of the list of nodes, topologically sorting the list of nodes such that input nodes of the respective node are before the respective node in the list of nodes. In these examples, converting the intermediate representation into the Boolean intermediate representation may further include, for each respective sorted node of the list of nodes, generating one or more single-bit logical gates representative of the one or more operations.

Optionally, converting the intermediate representation into the Boolean intermediate representation includes splitting a multi-bit parameter into a plurality of single-bit parameters. In some implementations, converting the intermediate representation into the Boolean intermediate representation includes appending a plurality of single-bit outputs into a single multi-bit output. Transpiling the Boolean intermediate representation into the second code in the high-level programming language may include, for each respective single-bit logical operation of the plurality of single-bit logical operations, replacing the respective single-bit logical operation with a corresponding FHE routine.

In some examples, the operations further include incorporating the second function into an application in the high-level programming language. Optionally, the high-level programming language includes C++. The operations further include, in some implementations, executing the second function to perform the one or more operations on the ciphertext.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5A-5E are schematic views of transformations and optimizations of an exemplary function into a second function using the system of FIG. 1.

Like reference symbols in the various drawings indicate like elements.

DETAILED DESCRIPTION

Figure 1:
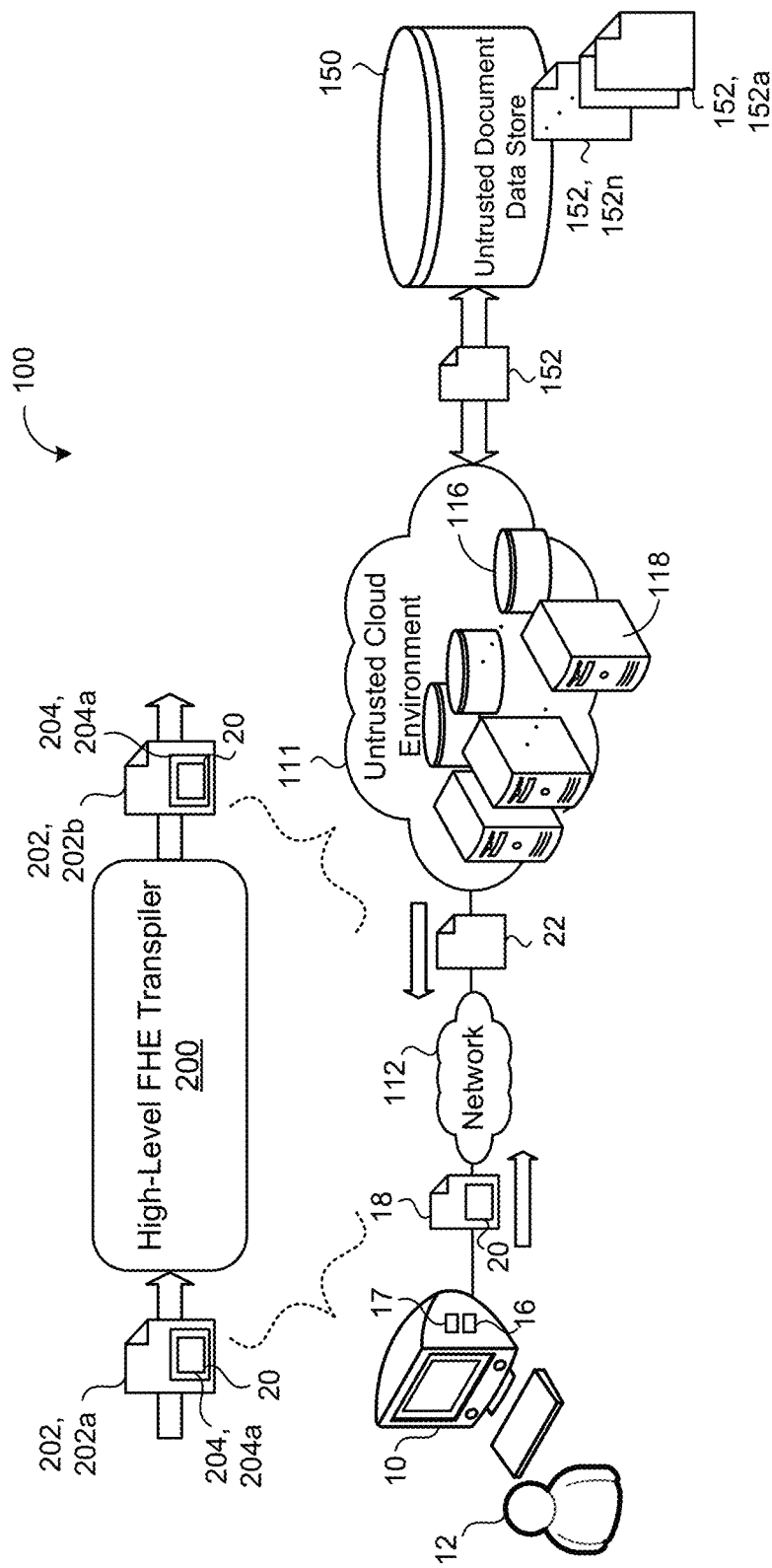
FIG. 1 is a schematic view of an example system that provides a fully homomorphic encryption transpiler for high-level languages.

Fully homomorphic encryption (FHE) is a technology by which arbitrary operations can be performed on encrypted data without the need to ever unencrypt the data. These resulting operations are left in an encrypted form which, when decrypted, result in an identical output to that produced had the operations been performed on the corresponding unencrypted data. Thus, homomorphic encryption can be used for privacy-preserving outsourced storage and computation. For example, a user can store encrypted data at an untrusted data store (e.g., a cloud database system). Using conventional encryption, if the user wishes to perform operations on the encrypted data (e.g., return results from a database), the user must either provide the untrusted data store with the decryption keys or retrieve the entire encrypted data set, decrypt the data, and perform the operations locally using the decrypted data. The first solution is not ideal from a security perspective and the second solution is not ideal from a bandwidth and storage perspective. However, homomorphic encryption allows for "searchable encryption" where the user can instruct the untrusted data store to perform operations on encrypted data and retrieve an encrypted result that the user can decrypt without ever exposing the plaintext or decryption key to the untrusted data store.

However, FHE requires specialized functions to properly manipulate the ciphertext. The current state of the art in FHE operates on primitive operators such as gates (AND gates, OR gates, NOT gates, etc.), ADD, and MUL. That is, operations must be distilled to basic gate level logic or basic arithmetic to perform the necessary logic to return the proper results. Requiring operations to be described at such primitive levels greatly restricts the problems to which FHE can be applied. For example, manually creating a thirty-two bit full adder requires 160 gates while more complex operations, such as string processing, quickly become infeasible. Thus, the gate count and hence time investment required for manually implementing even moderately complex computations quickly becomes infeasible.

Implementations herein include a high-level FHE transpiler that is capable of receiving any arbitrary function and/or application that is coded in a high-level programming language (e.g., C++) and used for performing operations on unencrypted data. The high-level FHE transpiler converts the received function into a new function, coded in the same high-level programming language, capable of performing the same operations on encrypted data (i.e., ciphertext). The high-level FHE transpiler obtains code in a high-level programming language that includes a function that is configured to perform operations on unencrypted data. The high-level FHE transpiler converts the function into an intermediate representation (IR) that includes multiple nodes each representing one or more logical operations. The high-level FHE transpiler converts the IR into a "Boolean IR" (i.e., "booleanizes" the IR) that includes multiple single-bit logical operations. The high-level FHE transpiles the Boolean IR into a function in the same high-level programming language that is configured to perform the same operations on encrypted data.

Referring to FIG. 1, in some implementations, an example system 100 includes a user device 10 associated with a respective user or client 12 and in communication with an untrusted remote system 111 via a network 112. The user device 10 may correspond to any computing device, such as a desktop workstation, a laptop workstation, or a mobile device (i.e., a smart phone). The user device 10 includes computing resources 17 (e.g., data processing hardware) and/or storage resources 16 (e.g., memory hardware).

The remote system 111 may be a single computer, multiple computers, or a distributed system (e.g., a cloud environment) having scalable/elastic computing resources 118 (e.g., data processing hardware) and/or storage resources 116 (e.g., memory hardware). An untrusted data store 150 (i.e., a remote storage device 150) is overlain on the storage resources 116 to allow scalable use of the storage resources 116 by one or more of the client or computing resources 118. The data store 150 is configured to store data blocks 152, 152a-n. As used herein, a data block 152 may refer to part or all of any item uploaded onto the remote system 111 for storage within the data store 150, such as, without limitation, emails, documents, calendar events, notes, database entries, pictures, audio files, etc.

In some implementations, the user device 10 sends a query or request 18 requesting the remote system 111 perform one or more operations 20 on the encrypted data blocks 152 stored at the untrusted data store 150. The remote system 111 does not have access to the decryption keys for the encrypted data blocks 152 and instead, using FHE, performs the one or more operations 20 on the encrypted data blocks 152. The remote system 111 returns an encrypted result 22 to the user device 10. The user device 10 may decrypt the result 22 (e.g., using the same key used to encrypt the data blocks 152). The decrypted result is the same result if equivalent operations 20 were performed on unencrypted data blocks 152.

To generate the operations 20, the user device 10, the remote system 111, or any other device in communication with the user device 10 and/or remote system 111, executes a high-level FHE transpiler 200. The high-level FHE transpiler 200 (also referred to herein as just the FHE transpiler 200) receives or obtains first code 202, 202a that includes a first function 204, 204a. The code 202a may be part or all of an application programmed in a high-level programming language such as C++, Java, Python, etc. The first function 204a is configured to perform the one or more operations 20 (e.g., search, sort, edit, etc.) on, for example, unencrypted data blocks 152 (i.e., plaintext).

The FHE transpiler 200, as explained in more detail below, transpiles the first function 204a into a second function 204, 204b. The second function 204b is coded in the same high-level programming language as the first function 204a (e.g., C++) and is configured to perform the same one or more operations 20 as the first function 204a on the encrypted data blocks 152. That is, the high-level FHE transpiler 200 receives code 202a in a high-level programming language that is programmed to perform operations 20 on unencrypted data 152 and transpiles the received code 202a into new code 202b in the same high-level programming language to perform the same operations 20 on encrypted data 152.

In some examples, the user device 10 executes the FHE transpiler 200 to generate the second function 204b for the request 18. That is, the second function 204b, via the request 18, instructs the remote system 111 how to manipulate the encrypted data blocks 152. In other examples, the user device 10 sends the first function 204a to the remote system 111 (e.g., via the request 18) and the remote system 111 executes the FHE transpiler 200 to convert the first function 204a to the second function 204b. In yet other examples, an independent computing system or device executes the FHE transpiler 200 and transmits the second function 204b to the user device 10 and/or the remote system 111.

Figure 2:
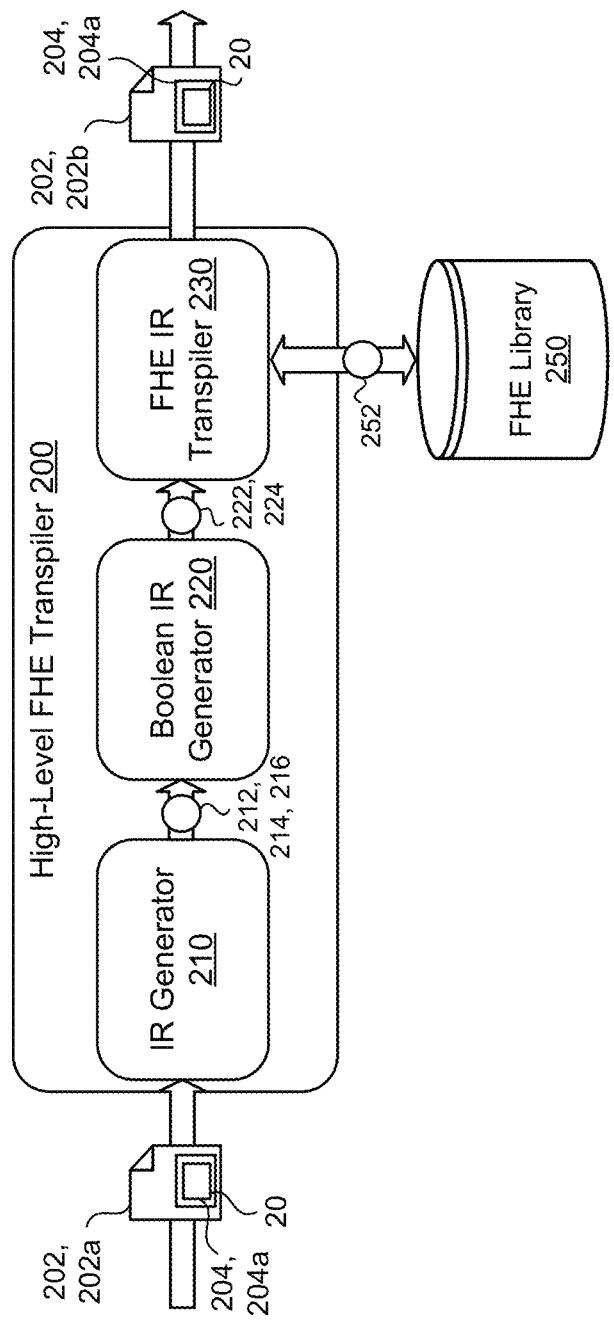
FIG. 2 is a schematic view of exemplary components of the system of FIG. 1.

Referring now to FIG. 2, in some implementations, the FHE transpiler 200 includes an intermediate representation (IR) generator 210. The IR generator 210 receives the first function 204a and converts the first function 204a into an IR 212 that includes a plurality of nodes 214. Each node 214 includes or represents a region of a circuit between two elements and has one or more inputs and one or more outputs. Put simply, the IR 212 is a data structure or code that represents the first function 204a. The IR 212 accurately represents the source code 202a (i.e., without loss of information) and is independent of the high-level programming language used to program the code 202a. The IR 212 provides an implementation more conducive for processing, optimization, and translation. In some examples, the IR generator 210 uses a high-level synthesis (HLS) or similar process to generate the IR 212.

Figure 3:
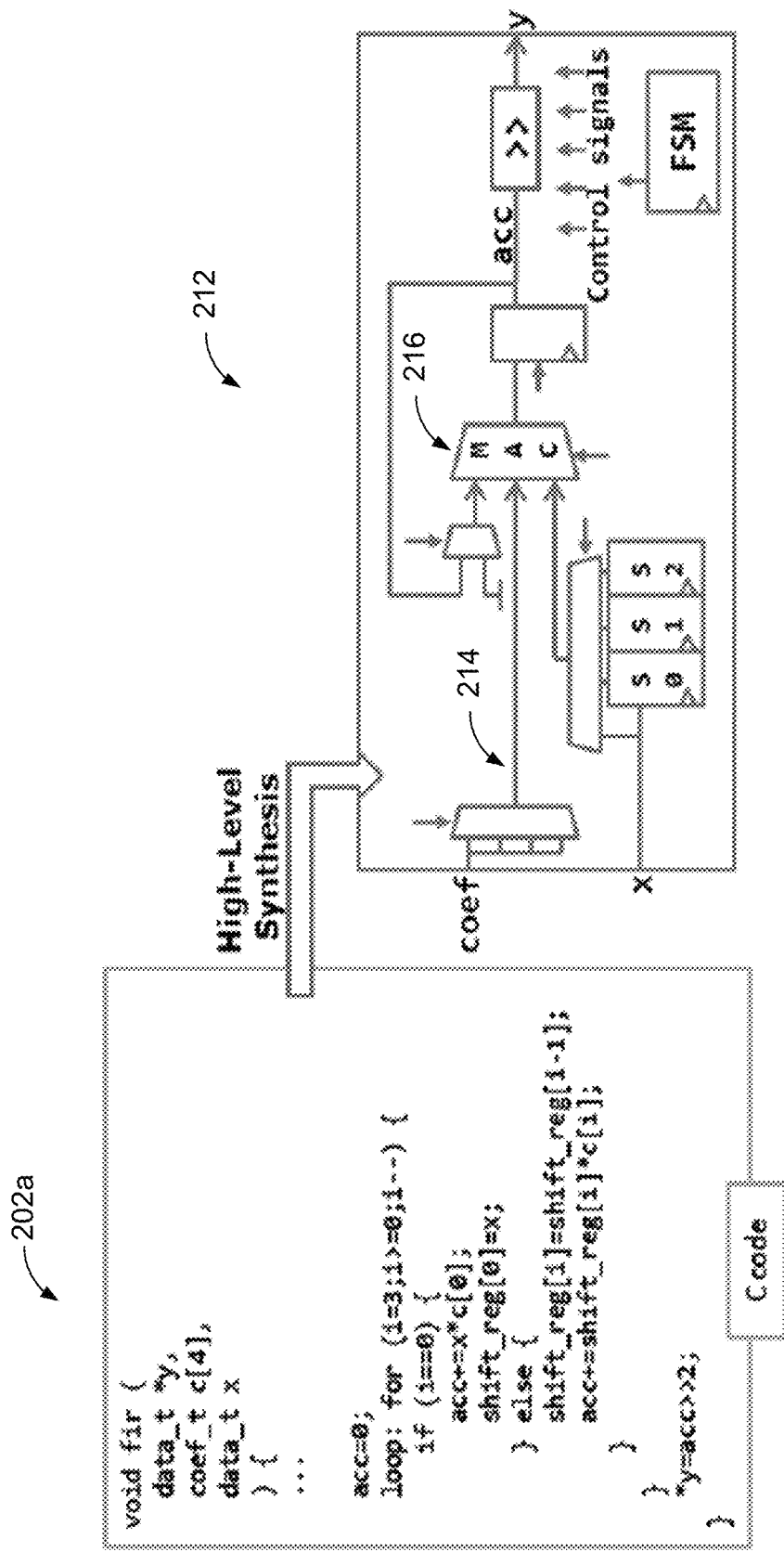
FIG. 3 is a schematic view of converting a function to an intermediate representation.

Referring now to FIG. 3, HLS refers to the process of determining a register-transfer level (RTL) structure that realizes given behavior of an input specification (i.e., the code 202a). In FIG. 3, exemplary code 202a defines a simple shift register in the high-level programming language C++. Here, high-level synthesis converts the code 202a into the exemplary intermediate representation 212. The IR 212, in this example, includes a visual representation (i.e., a schematic view) of a netlist that models a digital circuit that performs the operations of the code 202a. The netlist describes the connectivity of the digital circuit using a list of nodes 214. That is, the netlist includes a list of electronic components 216 and the nodes 214 each component 216 is connected to. The electronic components 216 include any device capable of affecting the signal (i.e., voltage) across the nodes 214. For example, the components 216 include flip flops, logic gates, multiplexors, decoders, etc., and the nodes 214 describe the connections between the components 216.

Figure 4:
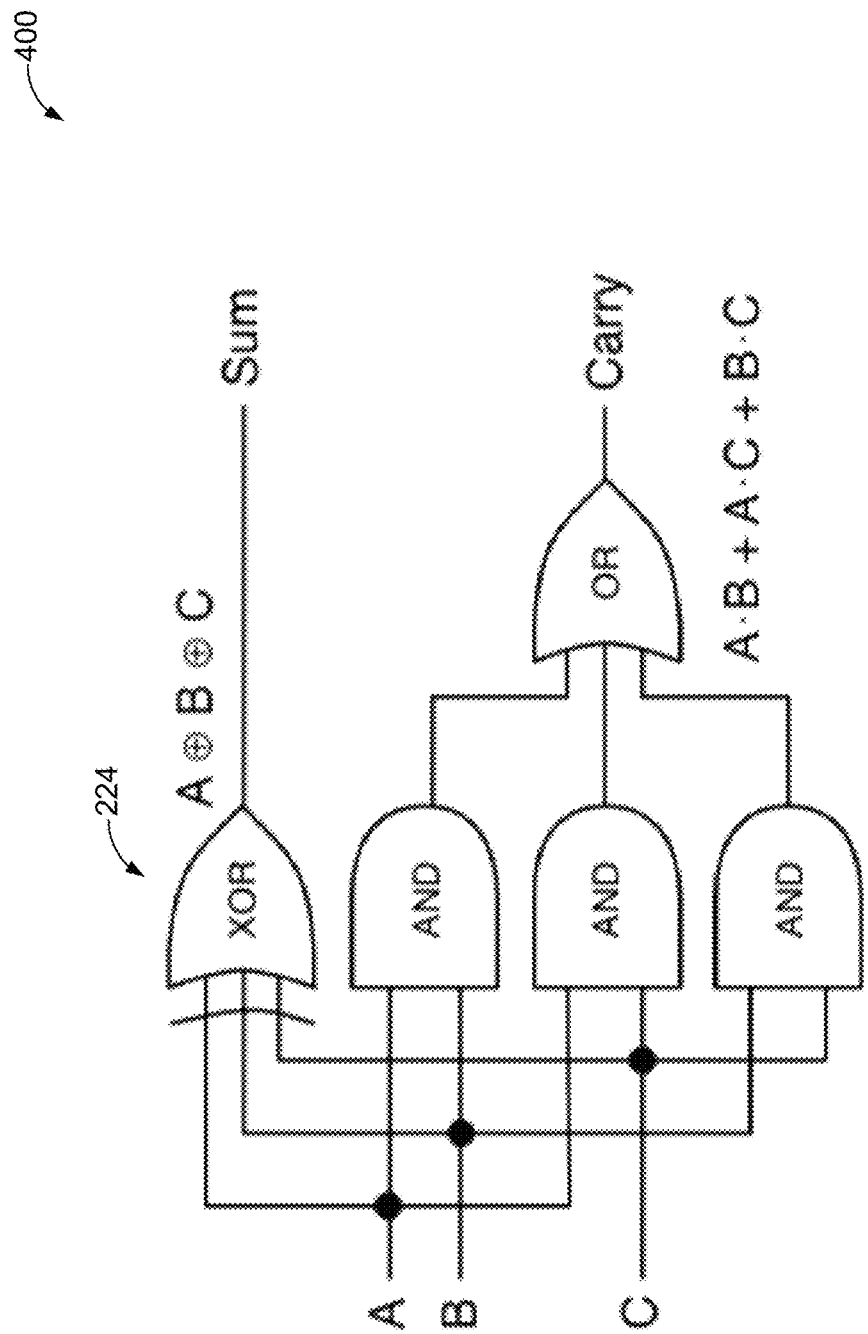
FIG. 4 is a schematic view of a function represented by fundamental logic operations.

Referring back to FIG. 2, in some examples, the FHE transpiler 200 includes a Boolean IR generator 220. The Boolean IR generator 220 receives the IR 212 from the IR generator 210 and "booleanizes" the IR 212. That is, the Boolean IR generator 220 converts, using the inputs and the outputs of the nodes 214 (i.e., the components 216), the IR 212 into a Boolean IR 222. The Boolean IR 222 includes multiple single-bit logical operations 224. A schematic view 400 (FIG. 4) includes an exemplary circuit representing an adder that consists of multiple single-bit logical operations 224. Here, an XOR gate, three AND gates, and an OR gate combine to generate a sum output and a carry output using an A, B, and C input.

The conversion from the IR 212 to the Boolean IR 222, in some examples, converts multi-bit composite operations represented by the IR 212 into single-bit fundamental operations. For example, the Boolean IR 222 includes single-bit logical operations (i.e., a single-bit width) that are made up of AND operations, OR operations, and/or NOT operations (i.e., logical gates).

In some implementations, the Boolean IR generator 220 converts the IR 212 into the Boolean IR 222 by, for each respective node 214, topologically sorting the list of nodes 214 such that the input nodes 214 of the respective node 214 are before the respective node 214 in the list of nodes 214. That is, the Boolean IR generator 220 topologically sorts the nodes 214 of the IR 212 to put the nodes 214 in an order such that, for any given node 214, all input nodes 214 (i.e., nodes 214 that provide an input to the respective node 214) are present earlier in the list.

The Boolean IR generator 220, in some examples, when converting the IR 212 into the Boolean IR 222, splits multi-bit parameters into multiple single-bit parameters. That is, the Boolean IR generator 220 takes the inputs to the function 204a (i.e., the input parameters) and "explodes" each parameter into single-bit entities. The Boolean IR generator 220 may designate each of these single-bit entities as parameters nodes 214 or components 216. Optionally, the Boolean IR generator 220, after sorting the list of nodes 214, for each node 214 in the sorted list, generates one or more single-bit logical gates representative of the one or more operations 20. For example, the Boolean IR generator 220 generates single-bit AND, OR, and NOT logical gates. The Boolean IR generator 220 may collect output gates (i.e., the set including the result) and associate the set of collected output gates with a respective one of the operations 20.

The Boolean IR generator 220, in some implementations, "stitches" the logical gates (i.e., the logical operations 224) together using input nodes 214 and outputs nodes 214. For example, when a later operation 20 requires a previous node 214, the Boolean IR generator 220 uses the associated output gates as the input to the next operation 20 being "booleanified." By repeating this process, the Boolean IR generator 220 generates a circuit that is capable of outputting the result of the combination of the one or more operations 20. The Boolean IR generator, in some implementations, when converting the IR 212 into the Boolean IR 222, appends multiple single-bit outputs into a single multi-bit output. That is, the Boolean IR generator 220 may "unexplode" or pack together the output bits back into a composite return result (i.e., a return type of the original function 204a).

With continued reference to FIG. 2, the high-level FHE transpiler 200 includes an FHE IR transpiler 230. The FHE IR transpiler 230 transpiles the Boolean IR 222 into the second code 202b programmed in the same high-level programming language as the first code 202a. The second code 202b includes the second function 204b that, when executed, performs, using fully homomorphic encryption, the one or more operations 20 on the ciphertext (i.e., the encrypted data blocks 152). To transpile the Boolean IR 222 into the second code 202b, in some examples, the FHE IR transpiler 230, for each respective single-bit logical operation 224 of the Boolean IR 222, replaces the respective single-bit logical operation 224 with a corresponding FHE routine 252. For example, the FHE IR transpiler 230 fetches FHE routines 252 from a FHE library 250 that includes the corresponding FHE routine 252 for each possible single-bit logical operation 224. Specifically, the FHE IR transpiler 230 may replace an AND logical operation 224 with an equivalent FHE AND routine 252 from the FHE library 250, an OR logical operation 224 with an equivalent OR routine 252 from the FHE library 250, and/or a NOT logical operation 224 with an equivalent NOT routine 252 from the FHE library 250.

Optionally, after generating the second code 202b, the FHE transpiler 200 incorporates the second code 202b and/or the second function 204b into an application using the same high-level programming language. For example, the FHE transpiler 200 transpiles several different functions 204 into their FHE-equivalent functions 204 and incorporates each of the FHE-equivalent functions 204 into an application designed to call the functions 204. The application may be executed by, for example, the user device 10 or the remote system 111 so that the remote system 111 may execute the one or more operations 20 on the encrypted data blocks 152 (i.e., ciphertext).

Referring now to FIGS. 5A-5E, schematic views 500a-500e illustrate an exemplary function 204a converted to an IR 212, a Boolean IR 222, and then transpiled to a second exemplary function 204b. Here, the schematic view 500a (FIG. 5A) includes a function 204a for capitalizing a string written using C++ syntax. That is, the function 204a receives a string as an input parameter, capitalizes each character in the string, and returns the capitalized string. The schematic view 500b (FIG. 5B) illustrates the function 204a of FIG. 5A after conversion to an IR 212. In some examples, and as shown in the schematic view 500c (FIG. 5C), the IR generator 210 performs optimizations on the IR 212 to generate an optimized IR 212, 212O. The optimized IR 212O may reduce computational complexity of the IR 212. As shown in the schematic view 500d (FIG. 5D), the IR 212 or optimized IR 212O is "flattened" into the Boolean IR 222 by the Boolean IR generator 220. The FHE IR transpiler 230, as shown in the schematic view 500e (FIG. 5E), transpiles the Boolean IR 222 into the second function 204b. In this example, the second function 204b, like the first function 204a, is programmed in C++(i.e., a high-level programming language). The second function 204b, when executed on encrypted data blocks 152, will perform the same operations (i.e., capitalize strings) as the first function 204a when executed on unencrypted data blocks 152.

Thus, the high-level FHE transpiler 200 allows the user 12 to perform any arbitrary operation 20 on encrypted data blocks 152 by automatically converting and transpiling functions 204a configured for unencrypted data into functions 204b configured for encrypted data. This allows the user 12 to perform complex operations 20 (e.g., SUM, MUL, and DIV operations) using FHE over encrypted data blocks 152 without the need to manually generate the circuits required. Moreover, the user 12 can reuse existing code programmed in a high-level programming language (including structs and classes) without an explicit configuration file and receive and inspect the transpiled functions in the same high-level programming language. The high-level FHE transpiler 200 first converts a function 204 with a programming intent into an array of logical gates (i.e., the IR 212). For example, the high-level FHE transpiler 200 uses high level synthesis. The high-level FHE transpiler 200 flattens the IR 212 into a Boolean IR 222, with which the high-level FHE transpiler 200 generates the transpiled code 202b.

Figure 6:
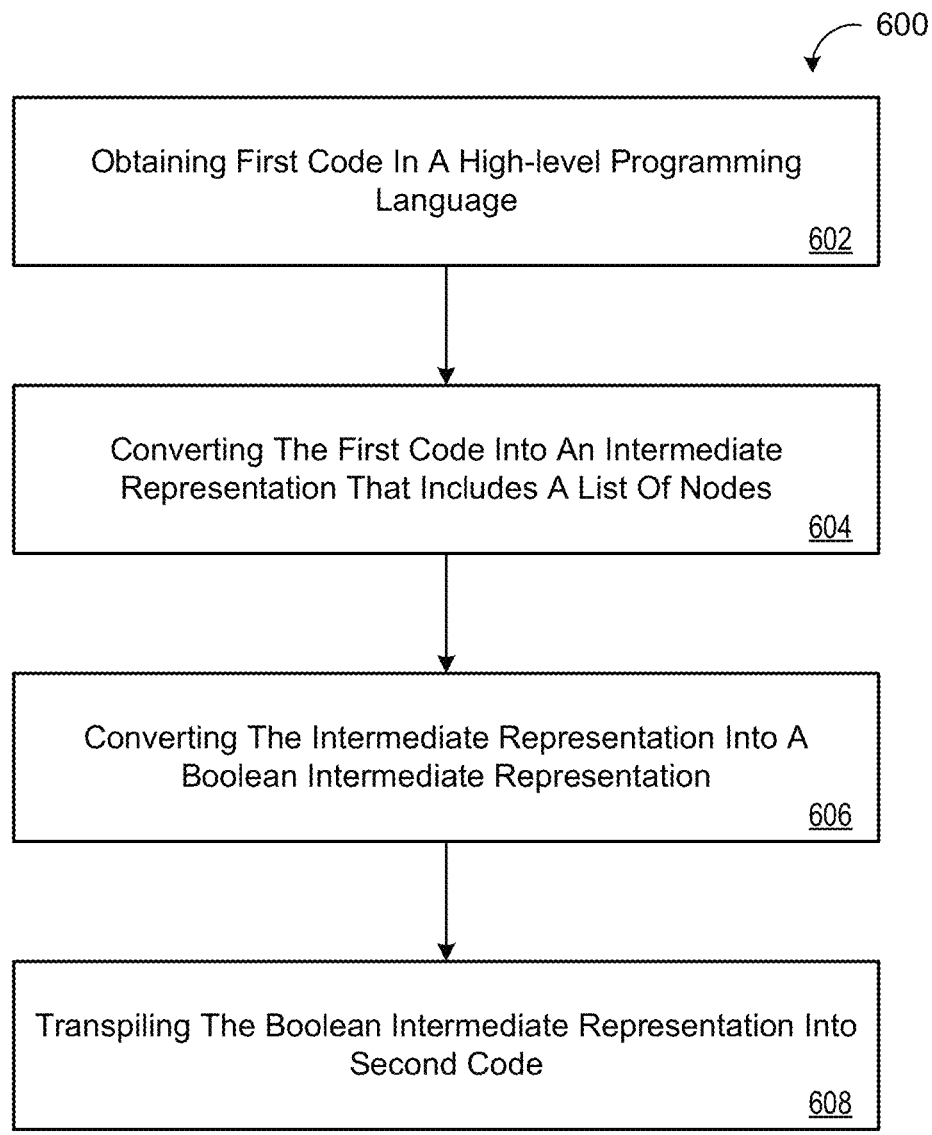
FIG. 6 is a flowchart of an example arrangement of operations for a method of providing fully homomorphic encryption transpiler for high-level languages.

FIG. 6 is a flowchart of an exemplary arrangement of operations for a method 600 for providing a fully homomorphic encryption transpiler for high-level languages. The method 600, at operation 602, includes obtaining first code 202a in a high-level programming language. The first code 202a represents a first function 204a for performing one or more operations 20 on plaintext. At operation 604, the method 600 includes converting the first code 202a into an intermediate representation 212 that includes a list of nodes 214. Each node 214 of the list of nodes 214 includes one or more inputs and one or more outputs. The method 600, at operation 606, includes converting, using the one or more inputs and the one or more outputs of each node 214 of the list of nodes 214, the intermediate representation 212 into a Boolean intermediate representation 222 that includes a plurality of single-bit logical operations 224. At operation 608, the method 600 includes transpiling the Boolean intermediate representation 222 into second code 202b in the high-level programming language. The second code 202b represents a second function 204b for performing, using fully homomorphic encryption (FHE), the one or more operations 20 on ciphertext 152.

Figure 7:
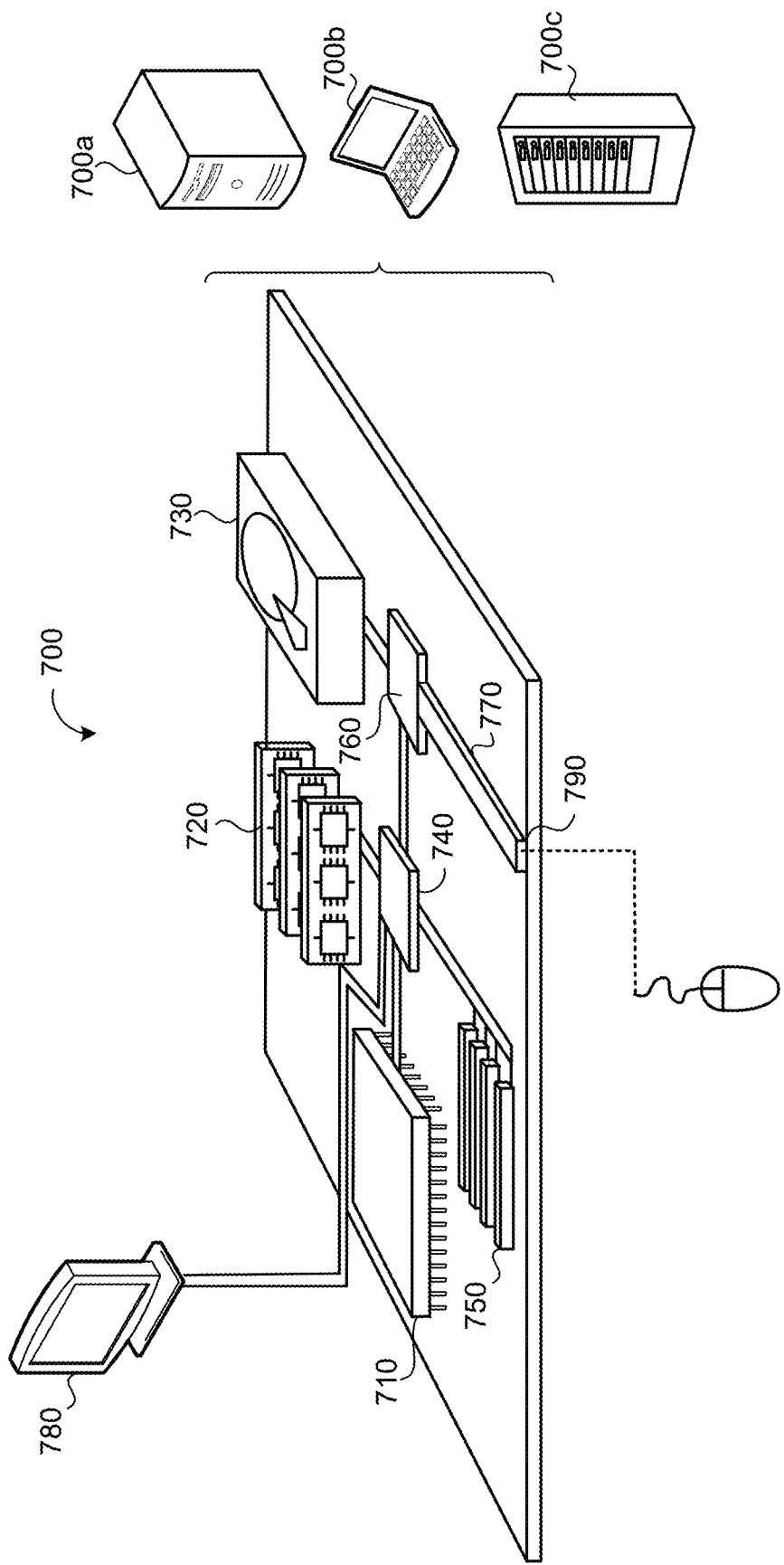
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory

720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining first code in a high-level programming language, the first code representing a first function for performing one or more operations on plaintext;
   converting the first code into an intermediate representation comprising a plurality of logical operations; and
   generating second code in the high-level programming language based on replacing each respective logical operation of the plurality of logical operations with a corresponding fully homomorphic encryption (FHE) routine, the second code representing a second function for performing, using FHE, the one or more operations on ciphertext.

2. The method of claim 1, wherein each of the plurality of logical operations comprises a respective single-bit logical operation.

3. The method of claim 2, wherein each respective single-bit logical operation comprises an AND operation, an OR operation, or a NOT operation.

4. The method of claim 1, wherein converting the first code into the intermediate representation comprising the plurality of logical operations further comprises converting the first code into a plurality of nodes, each node of the plurality of nodes comprising one or more inputs and one or more outputs.

5. The method of claim 4, wherein converting the first code into the intermediate representation comprising the plurality of logical operations further comprises topologically sorting the plurality of nodes.

6. The method of claim 5, wherein converting the first code into the intermediate representation comprising the plurality of logical operations further comprises, for each respective sorted node of the plurality of nodes, generating one or more single-bit logical gates representative of the one or more operations.

7. The method of claim 1, wherein converting the first code into the intermediate representation comprises splitting a multi-bit parameter into a plurality of single-bit parameters.

8. The method of claim 1, wherein the operations further comprise incorporating the second function into an application in the high-level programming language.

9. The method of claim 1, wherein the high-level programming language comprises C++.

10. The method of claim 1, wherein the operations further comprise executing the second function to perform the one or more operations on the ciphertext.

11. A system comprising:
data processing hardware; and
memory hardware in communication with the data processing hardware, the memory hardware storing instructions that when executed on the data processing hardware cause the data processing hardware to perform operations comprising:
   obtaining first code in a high-level programming language, the first code representing a first function for performing one or more operations on plaintext;
   converting the first code into an intermediate representation comprising a plurality of logical operations; and
   generating second code in the high-level programming language based on replacing each respective logical operation of the plurality of logical operations with a corresponding fully homomorphic encryption (FHE) routine, the second code representing a second function for performing, using FHE, the one or more operations on ciphertext.

12. The system of claim 11, wherein each of the plurality of logical operations comprises a respective single-bit logical operation.

13. The system of claim 12, wherein each respective single-bit logical operation comprises an AND operation, an OR operation, or a NOT operation.

14. The system of claim 11, wherein converting the first code into the intermediate representation comprising the plurality of logical operations further comprises converting the first code into a plurality of nodes, each node of the plurality of nodes comprising one or more inputs and one or more outputs.

15. The system of claim 14, wherein converting the first code into the intermediate representation comprising the plurality of logical operations further comprises topologically sorting the plurality of nodes.

16. The system of claim 15, wherein converting the first code into the intermediate representation comprising the plurality of logical operations further comprises, for each respective sorted node of the plurality of nodes, generating one or more single-bit logical gates representative of the one or more operations.

17. The system of claim 11, wherein converting the first code into the intermediate representation comprises splitting a multi-bit parameter into a plurality of single-bit parameters.

18. The system of claim 11, wherein the operations further comprise incorporating the second function into an application in the high-level programming language.

19. The system of claim 11, wherein the high-level programming language comprises C++.

20. The system of claim 11, wherein the operations further comprise executing the second function to perform the one or more operations on the ciphertext.

* * * * *